(12) United States Patent
Richardson et al.

(10) Patent No.: US 10,760,683 B2
(45) Date of Patent: Sep. 1, 2020

(54) CRADLE-MOUNTED SWASH WITH TRUNNION-MOUNTED POSITIONING ARMS

(71) Applicant: Parker-Hannifin Corporation, Cleveland, OH (US)

(72) Inventors: Jason Scot Richardson, Chuckey, TN (US); Richard C. Hynes, Greenville, TN (US); Thomas Kevin Castle, Greenville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 158 days.

(21) Appl. No.: 15/881,948

(22) Filed: Jan. 29, 2018

(65) Prior Publication Data
US 2018/0216731 A1    Aug. 2, 2018

Related U.S. Application Data

(60) Provisional application No. 62/452,893, filed on Jan. 31, 2017.

(51) Int. Cl.
*F16H 61/437* (2010.01)
*F16H 39/04* (2006.01)
(Continued)

(52) U.S. Cl.
CPC ......... *F16H 61/437* (2013.01); *F04B 1/2078* (2013.01); *F04B 1/2085* (2013.01);
(Continued)

(58) Field of Classification Search
CPC .... F01B 3/0073; F04B 1/2078; F04B 1/2085; F16H 61/437
See application file for complete search history.

(56) References Cited

U.S. PATENT DOCUMENTS 3,739,691 A * 6/1973 Bobier ................. F04B 1/20
91/506
3,967,541 A * 7/1976 Born ................... F01B 3/106
92/12.2

(Continued)

FOREIGN PATENT DOCUMENTS

DE           820241 C  * 11/1951  .............. F01B 3/007
GB        2010386 A   *  6/1979  ................ F04B 1/20
(Continued)

*Primary Examiner* — Michael Leslie
*Assistant Examiner* — Matthew Wiblin
(74) *Attorney, Agent, or Firm* — McDonnell Boehnen Hulbert & Berghoff LLP

(57) ABSTRACT

An example pump includes: (i) a swash block having (a) a first trunnion arm, (b) a second trunnion arm, and (c) a first curved support surface and a second curved support surface disposed on an exterior surface of the swash block; and (ii) a housing comprising (a) a first bore, (b) a second bore, and (c) an internal chamber having a first curved bushing and a second curved bushing, where the swash block is supported within the internal chamber of the housing by the first trunnion arm being positioned in the first bore of the housing, the second trunnion arm being positioned in the second bore of the housing, the first curved support surface being positioned against the first curved bushing of the housing, and the second curved support surface being positioned against the second curved bushing of the housing.

20 Claims, 10 Drawing Sheets

(51) Int. Cl.
*F16C 33/06* (2006.01)
*F04B 1/2085* (2020.01)
*F04B 1/324* (2020.01)
*F04B 1/2078* (2020.01)
*F04B 1/22* (2006.01)
*F04B 1/2035* (2020.01)

(52) U.S. Cl.
CPC .............. *F04B 1/324* (2013.01); *F16C 33/06* (2013.01); *F16H 39/04* (2013.01); *F04B 1/2035* (2013.01); *F04B 1/22* (2013.01)

(56) References Cited

U.S. PATENT DOCUMENTS

| | | | | |
|---|---|---|---|---|
| 4,269,574 A | * | 5/1981 | Bobier | F04B 1/2071 417/222.1 |
| 5,456,068 A | * | 10/1995 | Ishii | B60K 17/105 60/487 |
| 5,560,447 A | | 10/1996 | Ishii et al. | |
| 5,927,176 A | * | 7/1999 | Stolzer | F04B 1/2085 91/505 |
| 6,663,354 B2 | | 12/2003 | Forster | |
| 6,698,198 B1 | | 3/2004 | Schreier | |
| 6,701,825 B1 | * | 3/2004 | Langenfeld | F04B 1/324 60/487 |
| 8,984,871 B1 | | 3/2015 | Probst et al. | |
| 9,482,212 B1 | * | 11/2016 | Bethke | F04B 1/2007 |
| 2014/0140863 A1 | * | 5/2014 | Yasuda | F04B 1/2085 417/222.2 |

FOREIGN PATENT DOCUMENTS

| | | | | |
|---|---|---|---|---|
| WO | WO 2016/142037 | | 9/2016 | |
| WO | WO-2016142037 A1 | * | 9/2016 | ............ F04B 1/2078 |

* cited by examiner

CRADLE-MOUNTED SWASH WITH TRUNNION-MOUNTED POSITIONING ARMS

CROSS REFERENCE TO RELATED APPLICATION

The present application claims priority to U.S. provisional patent application No. 62/452,893, filed on Jan. 31, 2017, the entire contents of which are herein incorporated by reference as if fully set forth in this description.

BACKGROUND

The term "transmission" may refer generally to systems that provide speed and torque conversions from a rotating power source to another rotary or linear device. Hydrostatic transmission is a category of transmissions that includes a system in which power is generated and transmitted by pressurizing and releasing fluid through pumps and motors. The system works by converting energy harnessed from the movement of fluid through hydraulic pumps and motors to drive an axle of a vehicle. A hydrostatic transmission can be used to power many types of machines such as tractors, backhoes, and turf equipment, for example. A hydrostatic transmission is characterized in providing high power in a small duration of time.

SUMMARY

The present disclosure describes implementations that relate to a cradle-mounted swash with trunnion-mounted positioning arms. In a first example implementation, the present disclosure describes a pump. The pump includes: (i) a swash block having (a) a first trunnion arm on a first side of the swash block, (b) a second trunnion arm on a second side of the swash block, and (c) a first curved support surface and a second curved support surface disposed on an exterior surface of the swash block; and (ii) a housing including (a) a first bore, (b) a second bore, and (c) an internal chamber having a first curved bushing and a second curved bushing. The swash block is supported within the internal chamber of the housing by the first trunnion arm being positioned in the first bore of the housing, the second trunnion arm being positioned in the second bore of the housing, the first curved support surface being positioned against the first curved bushing of the housing, and the second curved support surface being positioned against the second curved bushing of the housing.

In a second example implementation, the present disclosure describes a pump. The pump includes: (i) a swash block having a first curved support surface and a second curved support surface disposed on an exterior surface of the swash block; (ii) a first trunnion arm mounted to the swash block and extending from a first side of the swash block; (iii) a second trunnion arm mounted to the swash block and extending from a second side of the swash block opposite the first side; (iv) a housing defining: (a) an internal chamber in which the swash block is disposed, where the internal chamber includes a first curved bushing and a second curved bushing, (b) a first bore, where the first trunnion arm is rotatably mounted through the first bore, and (c) a second bore, where the second trunnion arm is rotatably mounted through the second bore, such that the swash block is supported at the first bore and the second bore, where the first curved bushing interfaces with the first curved support surface and the second curved bushing interfaces with the second curved support surface; and (v) a locator bushing disposed between the first trunnion arm and the first bore, where the locator bushing has a curved exterior peripheral surface and a flat interior surface, and where the flat interior surface of the locator bushing is coupled to a corresponding flat exterior surface of the first trunnion arm.

In a third example implementation, the present disclosure describes a hydrostatic transmission. The hydrostatic transmission includes: (i) a motor section housing a motor rotatable by fluid; and (ii) a pump section coupled to the motor section and configured to provide the fluid to the motor. The pump section includes: (i) a swash block mounted to a first trunnion arm extending from a first side of the swash block and a second trunnion arm extending from a second side of the swash block opposite the first side, where the swash block has a first curved support surface and a second curved support surface disposed on an exterior surface of the swash block; (ii) a housing including (a) a first bore, (b) a second bore, and (c) an internal chamber having a first curved bushing and a second curved bushing, where the swash block is supported within the internal chamber of the housing by the first trunnion arm being positioned in the first bore of the housing, the second trunnion arm being positioned in the second bore of the housing, the first curved support surface being positioned against the first curved bushing of the housing, and the second curved support surface being positioned against the second curved bushing of the housing; and (iii) a locator bushing disposed between the first trunnion arm and the first bore, where the locator bushing is double half-moon shaped that defines a curved exterior peripheral surface and a flat interior surface, where the flat interior surface is coupled to a corresponding flat exterior surface of the first trunnion arm.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

An example transmission may include a piston-type variable displacement hydraulic pump and a hydraulic motor. The transmission may include a reservoir, which houses the pump, an end-block, which transmits fluid power from the pump to a motor, and a motor housing, which mounts the transmission to a frame of a vehicle.

The reservoir may be referred to as a pump section, and may house a displacement control mechanism or swash mechanism configured to control the flow of fluid generated by the pump. Example swash mechanisms may include a cradle-mounted swash and a trunnion-mounted swash.

Figure 1A:
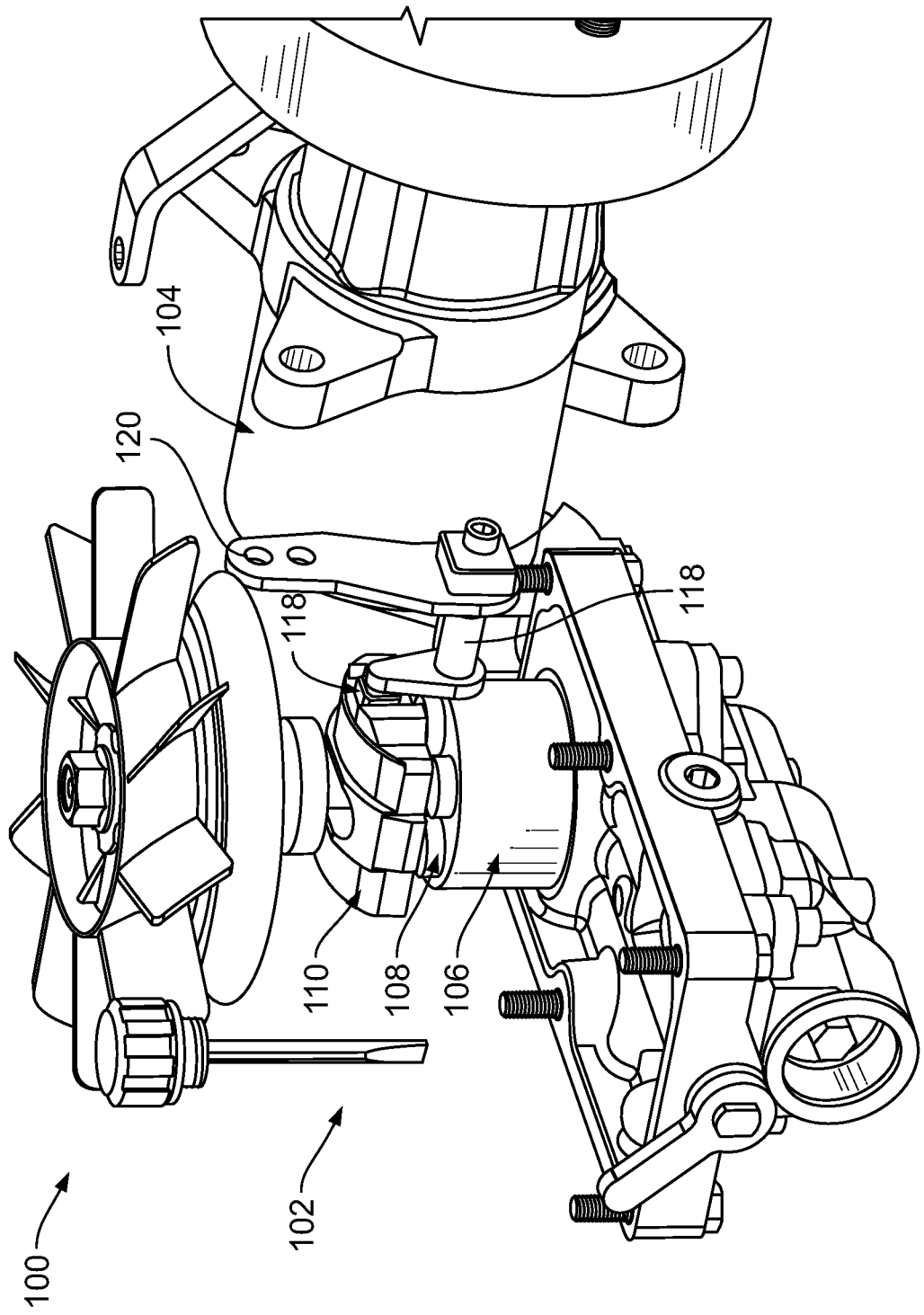
FIG. 1A illustrates a partial perspective view of a hydrostatic transmission with a cradle-mounted swash, in accordance with an example implementation.
Figure 1B:
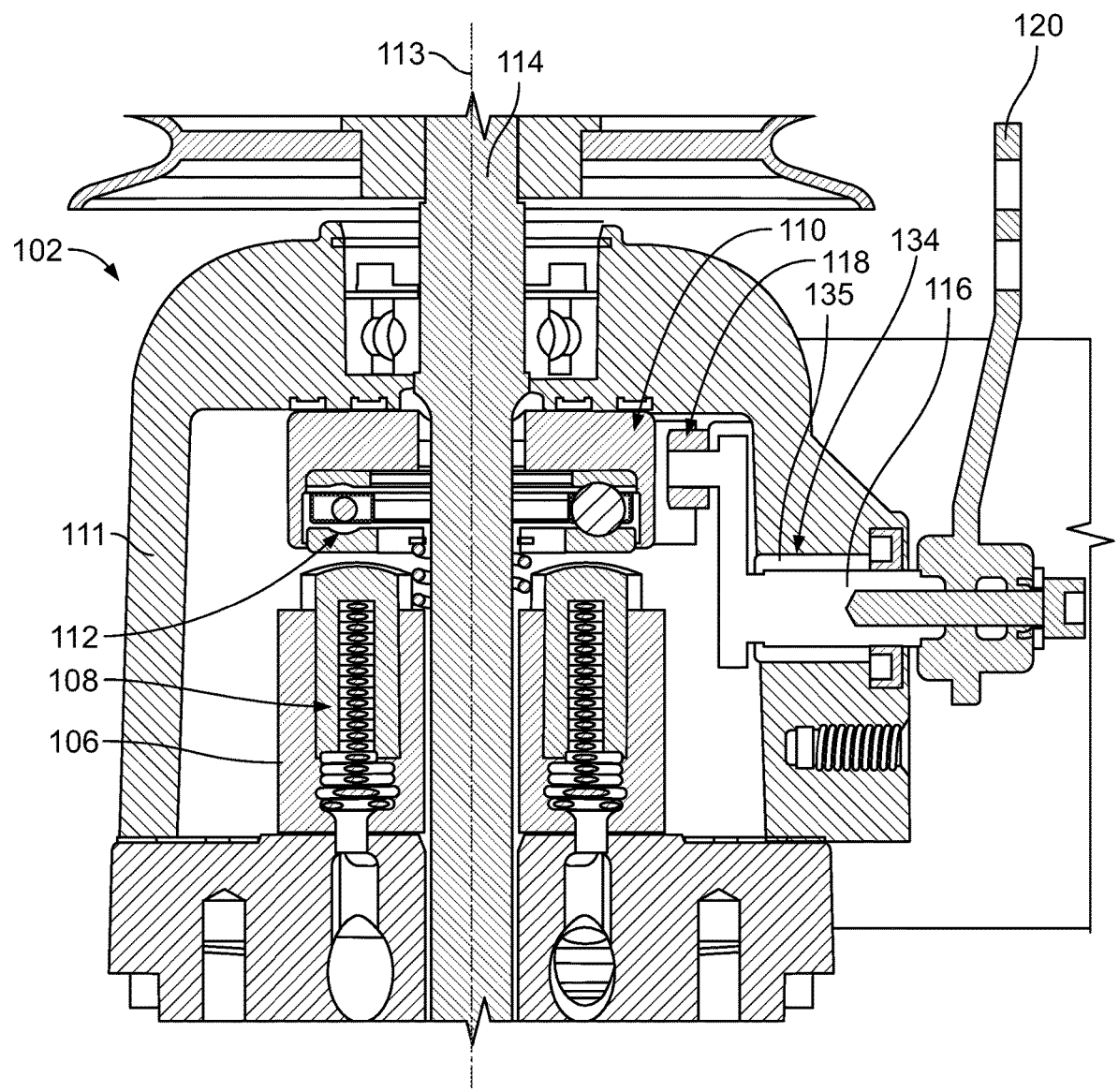
FIG. 1B illustrates a cross section of a pump section of the hydrostatic transmission shown in FIG. 1A, in accordance with an example implementation.

FIG. 1A illustrates a partial perspective view of a hydrostatic transmission 100 with a cradle-mounted swash, and FIG. 1B illustrates a cross section of a pump section 102 of the hydrostatic transmission 100, in accordance with an example implementation. FIGS. 1A and 1B are described together.

Referring to FIG. 1A, the hydrostatic transmission 100 includes a pump section 102 for generating fluid, and a motor section 104 for housing a motor rotatable by the fluid. The motor section 104 is configured to mount the hydrostatic transmission 100 to a frame of a vehicle. The pump section 102 includes a pump barrel 106 that houses a plurality of pistons such as piston 108 configured to reciprocate in the pump barrel 106 to generate fluid flow. The pump section 102 further includes a swash block 110.

As shown in FIG. 1B, the swash block 110 is mounted to a cradle of a housing 111 of the pump section 102. The swash block 110 is configured to receive a swash plate thrust bearing 112. The pump barrel 106 and the piston(s) 108 are configured to rotate about a longitudinal axis 113 of an input shaft 114, while the piston(s) 108 remain engaged with the swash plate thrust bearing 112.

In a neutral position, the swash plate thrust bearing 112 is perpendicular to the input shaft 114, and thus the piston(s) 108 do not reciprocate as they rotate and no fluid flow is generated. If the swash plate thrust bearing 112 rotates about an axis perpendicular to the longitudinal axis 113 of the input shaft 114, the piston(s) 108 reciprocate within the pump barrel 106 to provide flow.

The pump section 102 includes a trunnion arm 116 extending out of the housing 111 of the pump section 102. A slider block 118 is slidably coupled to a side of the swash block 110 and connected to the trunnion arm 116. An input lever 120 is coupled to an end of the trunnion arm 116.

Figure 1C:
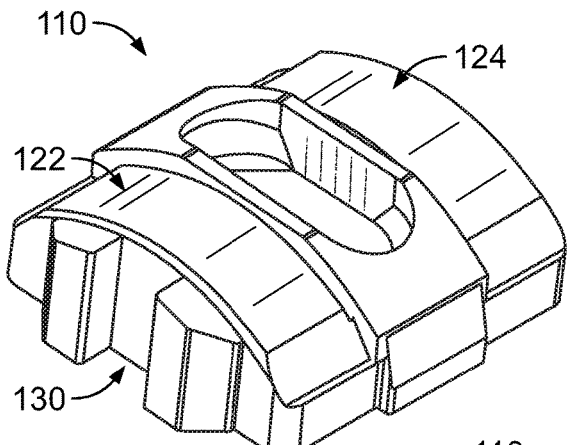
FIG. 1C illustrates a perspective top view of a swash block, in accordance with an example implementation, in accordance with an example implementation.
Figure 1D:
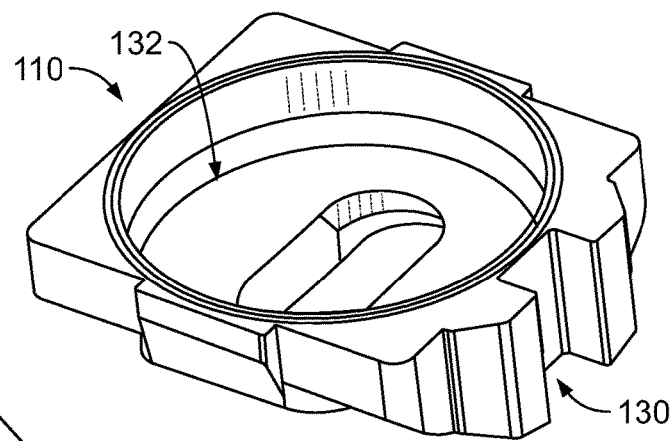
FIG. 1D illustrates a perspective bottom view of the swash block shown in FIG. 1C, in accordance with an example implementation.
Figure 1E:
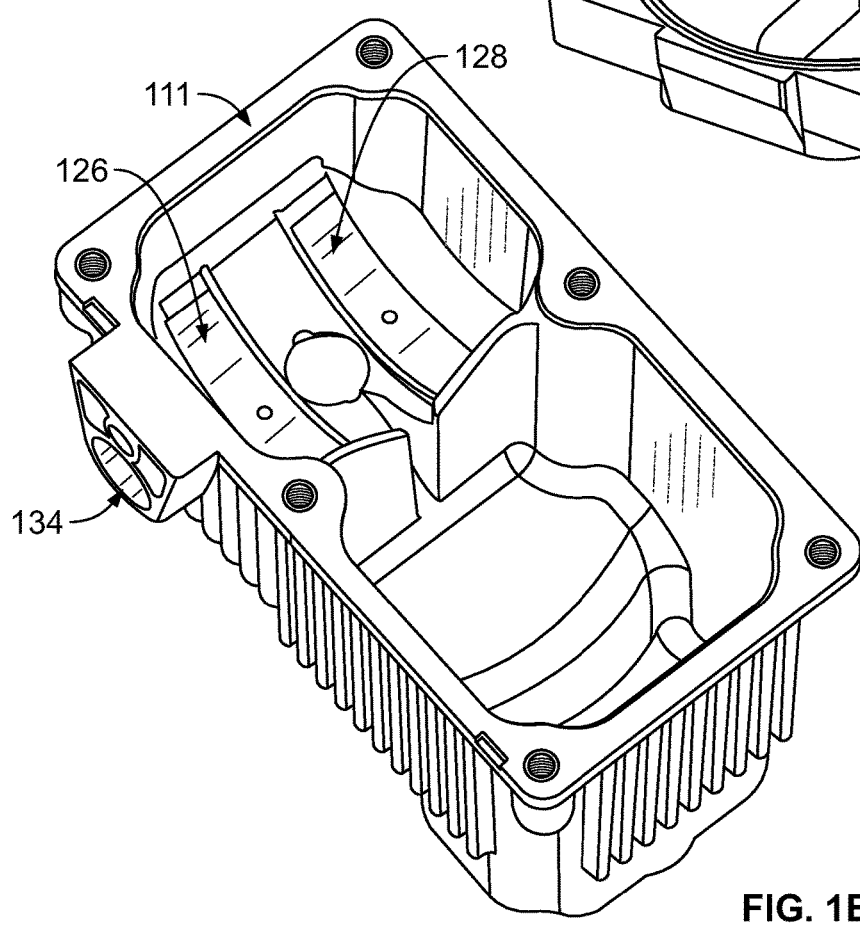
FIG. 1E illustrates a perspective bottom view of a housing of the pump section shown in FIG. 1B, in accordance with an example implementation.

FIG. 1C illustrates a perspective top view of the swash block 110, FIG. 1D illustrates a perspective bottom view of the swash block 110, and FIG. 1E illustrates a perspective bottom view of the housing 111, in accordance with an example implementation. As shown in FIG. 1C, the swash block 110 defines two ground curved support surfaces 122 and 124 configured to be received at corresponding two sliding-layer smooth bushings 126 and 128 in the housing 111 shown in FIG. 1E. In examples, the housing 111 may have a cast interior surface defining recessed areas to hold the bushings 126 and 128 in place. In these examples, the recessed areas may include a raised button to keep the bushings 126 and 128 from sliding in the housing 111.

Also, as shown in FIG. 1C, the swash block 110 defines a channel 130 on one side thereof. The channel 130 is configured to slidably accommodate the slider block 118 described above. Further, as shown in FIG. 1D, the swash block 110 defines therein a thrust bearing location 132 configured to receive the swash plate thrust bearing 112.

Referring to FIG. 1E, the housing 111 defines a trunnion shaft bore 134 configured to receive the trunnion arm 116 therethrough. The trunnion arm 116 may be supported via a trunnion support bushing 135 in the trunnion shaft bore 134 as shown in FIG. 1B.

In operation, the trunnion arm 116 is used to control an angle of the swash plate thrust bearing 112 relative to the longitudinal axis 113 of the input shaft 114. Particularly, as the input lever 120 is rotated a given angle, the trunnion arm 116 rotates causing the slider block 118 to slide within the channel 130 of the swash block 110. As the slider block 118 slides within the channel 130, it pushes the swash block 110, causing the support surfaces 122 and 124 to slide relative to the smooth bushings 126 and 128 of the housing 111. As a result, the swash block 110 and the swash plate thrust bearing 112 received therein rotate to a particular angle. The angle of the swash plate thrust bearing 112 relative to the longitudinal axis 113 of the input shaft 114 defines an extent of linear travel (i.e., the stroke) of the piston(s) 108, and thus controls the amount of flow provided by the pump section 102. Different rotation angles result in different amounts of flow.

In examples, a ratio of input angle of the input lever 120 to swash angle of the swash block 110 or the swash plate thrust bearing 112 may range, for example, from about 1.2:1 to about 1.6:1. This configuration may allow for about 20° of input lever control movement while the swash block 110 and the swash plate thrust bearing 112 moves about 14°. The term "about" is used herein to indicate a deviation or tolerance in a range of ±10% of the measured quantity. This configuration may allow for a reduced control effort exerted to move the swash block 110.

As the pump barrel 106 and the piston(s) 108 rotate, while the piston(s) 108 reciprocate, the swash block 110 and the swash plate thrust bearing 112 may vibrate. However, the trunnion arm 116 is isolated from such vibration because the trunnion arm 116 is not directly coupled to the swash block 110, but interfaces therewith via the slider block 118. Because of this isolation of the trunnion arm 116 from the swash block 110, vibration and sound energy resulting during operation are not transmitted to the housing 111 at the trunnion shaft bore 134.

Also, the swash block 110 is not directly mounted to the housing 111. The curved support surfaces 122 and 124 of the swash block 110 interface with the corresponding bushings 126 and 128 in the housing 111. Thus, the swash block 110 floats in an internal chamber or internal space of the housing 111 and the housing 111 is isolated from the swash block 110. Further, the internal space of the housing 111 may include fluid such that the components therein are submerged in fluid. As such, a film of lubricant or a fluid may be disposed between the curved support surfaces 122 and 124 and the corresponding bushings 126 and 128, and the fluid may absorb and dampen any vibration or noise energy and further isolate the housing 111.

However, the configuration shown in FIGS. 1A-1E is susceptible to tolerance issues. Also, friction resulting between the slider block 118 and the channel 130 as the slider block 118 slides therein may cause hysteresis, backlash, and controllability challenges. Further, the trunnion arm 116 is supported on one side of the housing 111 at the trunnion shaft bore 134, while floating in the internal space of the housing 111 on the other side. Thus, the swash block 110 is driven from one side of the housing 111, and is allowed to twist relative to the input shaft 114 as the input lever 120 is rotated. Twisting of the swash block 110 can create binding and drag on the swash block 110 as it is rotated, thus leading to variable control efforts and increased friction. A trunnion-mounted swash block that is supported on both sides may alleviate some of these challenges as described next.

Figure 2A:
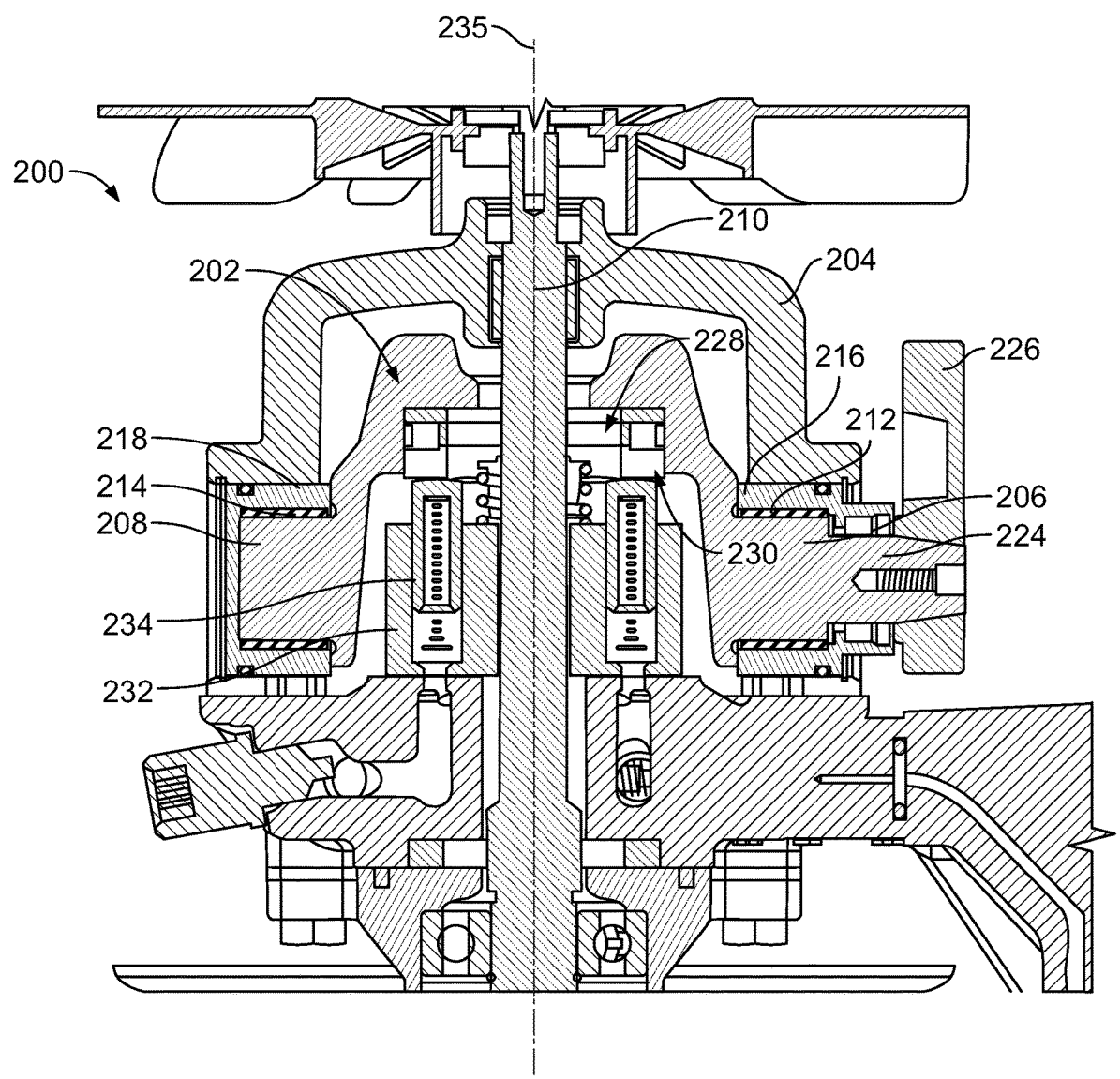
FIG. 2A illustrates a partial cross section of a hydrostatic transmission having a trunnion-mounted swash block, in accordance with an example implementation.

FIG. 2A illustrates a partial cross section of a hydrostatic transmission 200 having a trunnion-mounted swash block 202, in accordance with an example implementation. As depicted in FIG. 2A, the trunnion-mounted swash block 202 is a single-piece configuration that is supported within a housing 204 at both sides.

Figure 2B:
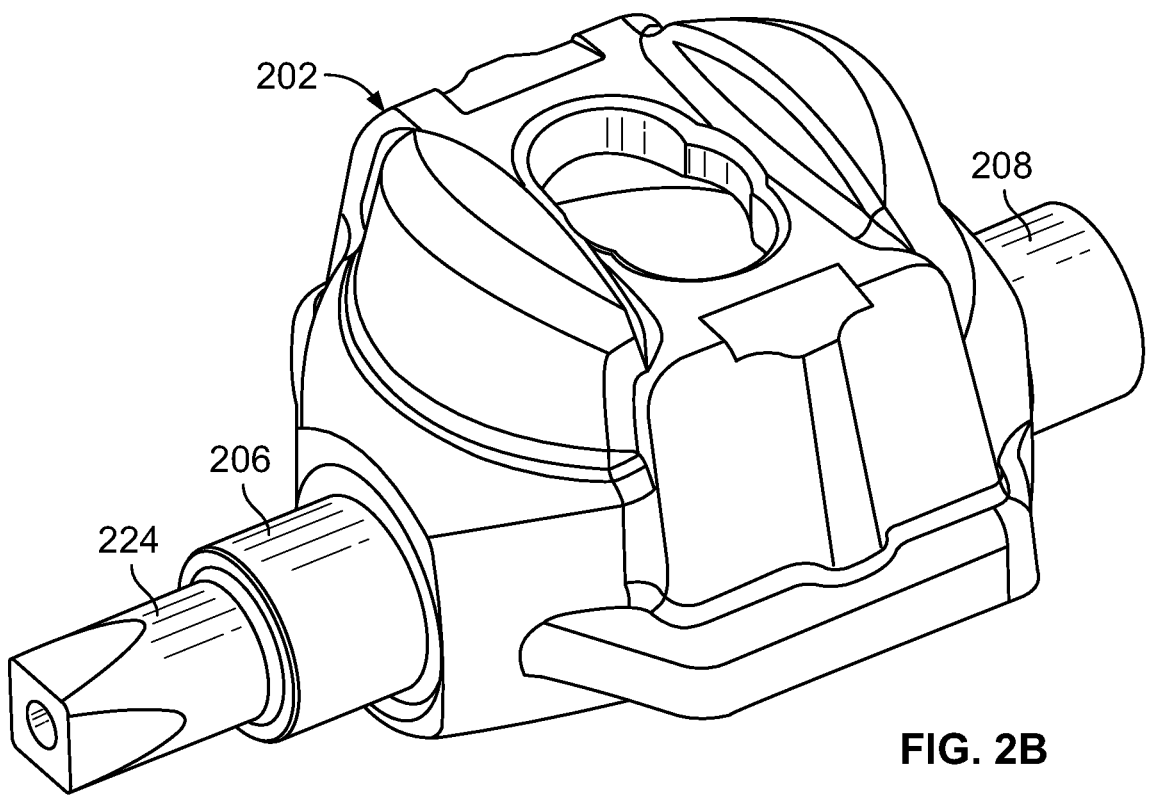
FIG. 2B illustrates a perspective view of the trunnion mounted swash block shown in FIG. 2A, in accordance with an example implementation.

FIG. 2B illustrates a perspective view of the trunnion-mounted swash block 202, in accordance with an example implementation. As depicted, the trunnion-mounted swash block 202 has, or is mounted to, two cylindrical trunnion arms 206 and 208 extending on both sides therefrom.

Referring back to FIG. 2A, the trunnion arms 206 and 208 are configured to be perpendicular to an input shaft 210. The trunnion arms 206 and 208 interface with two cylindrical support bushings 212 and 214, respectively. Specifically, an interior peripheral surface of the bushing 212 interfaces with an exterior peripheral surface of the trunnion arm 206, while an exterior peripheral surface of the bushing 212 interfaces with an interior peripheral surface of a first cylindrical trunnion arm cap 216. In this configuration, the bushing 212 and the trunnion arm 206 are mounted within an open annular space defined by the trunnion arm cap 216. Similarly, an interior peripheral surface of the bushing 214 interfaces with an exterior peripheral surface of the trunnion arm 208, while an exterior peripheral surface of the bushing 214 interfaces with an interior peripheral surface of a second cylindrical trunnion arm cap 218. In this configuration, the bushing 214 and the trunnion arm 208 are mounted within an open annular space defined by the trunnion arm cap 218.

Figure 2C:
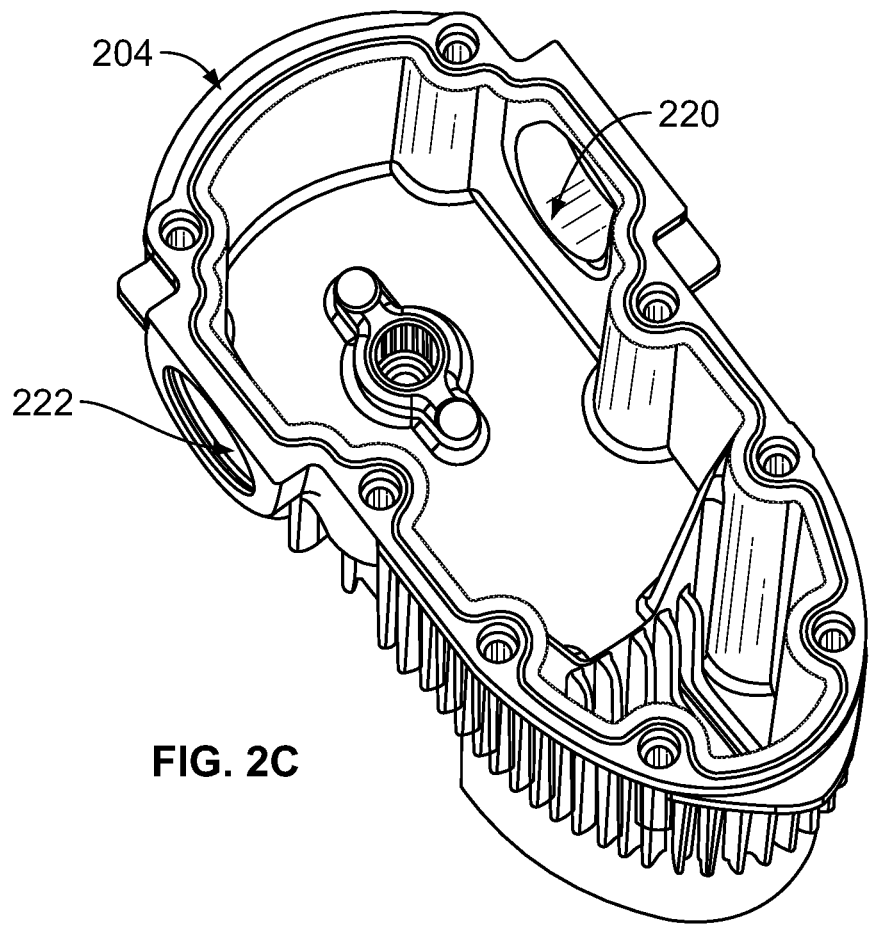
FIG. 2C illustrates a bottom perspective view of a housing of the hydrostatic transmission shown in FIG. 2A, in accordance with an example implementation.

FIG. 2C illustrates a bottom perspective view of the housing 204, in accordance with an example implementation. The housing 204 includes trunnion bushing bores 220 and 222 configured to receive the trunnion arm caps 216 and 218, respectively, and facilitate mounting the trunnion-mounted swash block 202 to the housing 204.

Referring back to FIG. 2A, a control arm 224 is integrated with the trunnion arm 206 and the trunnion-mounted swash block 202 and extends outwardly therefrom. An input lever 226 is coupled to an end of the control arm 224. With this configuration, as the input lever 226 is rotated, the control arm 224, the trunnion arm 206, and the trunnion-mounted swash block 202 rotate relative to the input shaft 210. The trunnion-mounted swash block 202 rotates while supported on both sides at the trunnion bushing bores 220 and 222 via the trunnion arms 206 and 208.

As shown in FIG. 2A, the trunnion-mounted swash bock 202 is configured to receive a thrust bearing 228 and a swash plate 230 coupled thereto. The hydrostatic transmission 200 also includes a pump barrel 232 configured to house a plurality of piston(s) 234 secured against and engaging with the swash plate 230. The pump barrel 232 and the piston(s) 234 are configured to rotate with the input shaft 210.

In a neutral position, the swash plate 230 is perpendicular to a longitudinal axis 235 of the input shaft 210. In this neutral position, the piston(s) 234 do not reciprocate within the pump barrel 232 as they rotate about and with the input shaft 210, and fluid might not be provided. If the input lever 226 is rotated, the trunnion-mounted swash block 202 and the swash plate 230 rotate about an axis perpendicular to the longitudinal axis 235 of the input shaft 210. In this rotated position, the piston(s) 234 are forced to reciprocate within the pump barrel 232 as they rotate about the input shaft 210. Different rotation angles result in different amounts of fluid flow generated from the pump section of the hydrostatic transmission 200.

With this configuration, in contrast to the swash block 110, the trunnion-mounted swash block 202 rotates while supported at both sides via both trunnion arms 206 and 208. Thus, the trunnion-mounted swash block 202 might not be twisted about the longitudinal axis 235 when the input lever 226 is rotated. Further, the single-piece configuration of the trunnion-mounted swash block 202 allows for enhanced control of swash angle due to the direct connection between the input lever 226 and the swash plate 230. This configuration creates a zero backlash assembly, which renders a one-to-one relationship between an angle of the input lever 226 and a respective angle of the swash plate 230.

However, in contrast to the trunnion arm 116 being isolated from the swash block 110, with the configuration of FIGS. 2A-2C, the trunnion arms 206 and 208 are integrated with the trunnion-mounted swash block 202. As such, the trunnion arms 206 and 208 are not isolated from vibration and hydraulic noise resulting from the piston(s) 234 as they rotate about the longitudinal axis 235 of the input shaft 210 and reciprocate within the pump barrel 232.

As a result, vibration and noise may be transmitted from the trunnion arms 206 and 208 to the input lever 226 and the housing 204, and from the housing 204 to the chassis of the machine, to which the hydrostatic transmission 200 is coupled. To dampen noise and vibration transmission, material may be added to reinforce the trunnion-mounted swash block 202, at the expense of increasing costs and possibly increasing the size of the hydrostatic transmission 200.

Disclosed next are systems, assemblies, hydrostatic transmission, and apparatuses that alleviate the drawbacks of the configuration shown in FIGS. 1A-1E and the configuration shown in FIGS. 2A-2C, while having the advantages of both configurations.

Figure 3A:
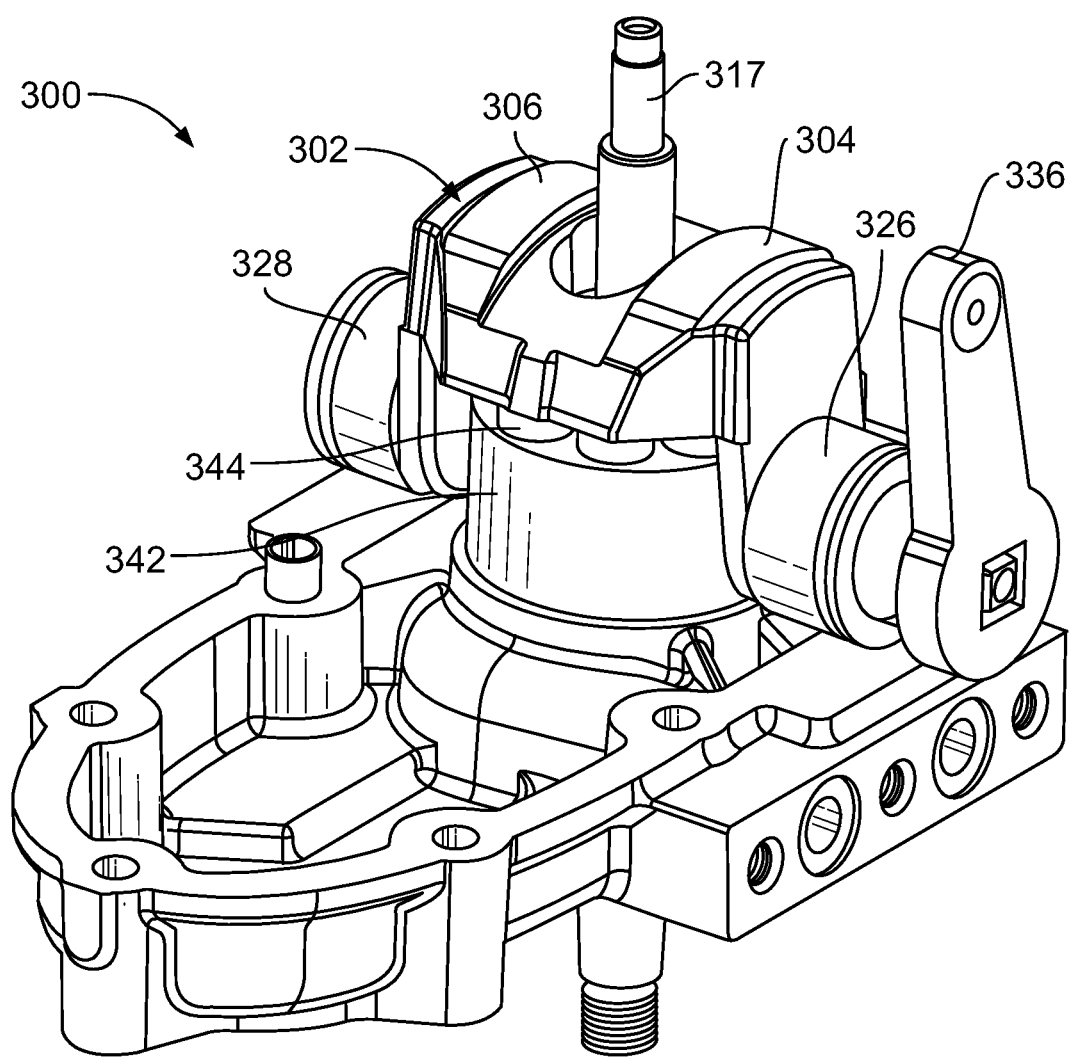
FIG. 3A illustrates a partial perspective view of a hydrostatic transmission having a cradle-mounted swash block, in accordance with another example implementation.

FIG. 3A illustrates a partial perspective view of a hydrostatic transmission 300 having a cradle-mounted swash block 302, in accordance with an example implementation. As depicted in FIG. 3A, the cradle-mounted swash block 302 is a single-piece configuration similar to the trunnion-mounted swash block 202. However, similar to the swash block 110, the cradle-mounted swash block 302 defines two ground curved support surfaces 304 and 306 that facilitate mounting cradle-mounted swash block 302 within a cradle of a housing 308 (shown in FIGS. 3B and 3C) of the pump section of the hydrostatic transmission 300.

Figure 3B:
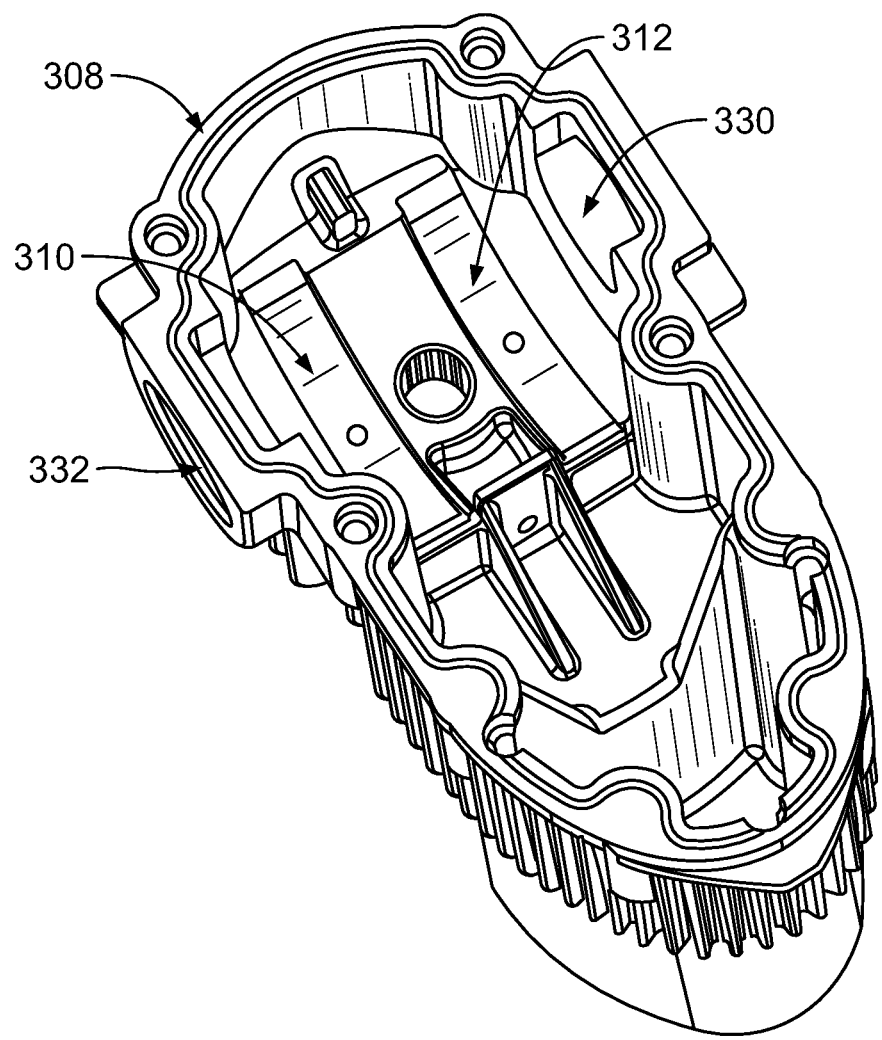
FIG. 3B illustrates a perspective bottom view of a housing of the hydrostatic transmission shown in FIG. 3A, in accordance with an example implementation.

FIG. 3B illustrates a perspective bottom view of the housing 308, in accordance with an example implementation. As shown, a cradle within the housing 308 includes two sliding-layer smooth bushings 310 and 312 corresponding to, and configured to interface with, the curved support surfaces 304 and 306. Further, the internal space of the housing 308 may include fluid such that the components therein are submerged in fluid. As such, a film of lubricant or a fluid may be disposed between the curved support surfaces 304, 306 and the bushings 310 and 312 to facilitate relative motion therebetween, while isolating the housing 308 from noise and vibration transmission.

Figure 3C:
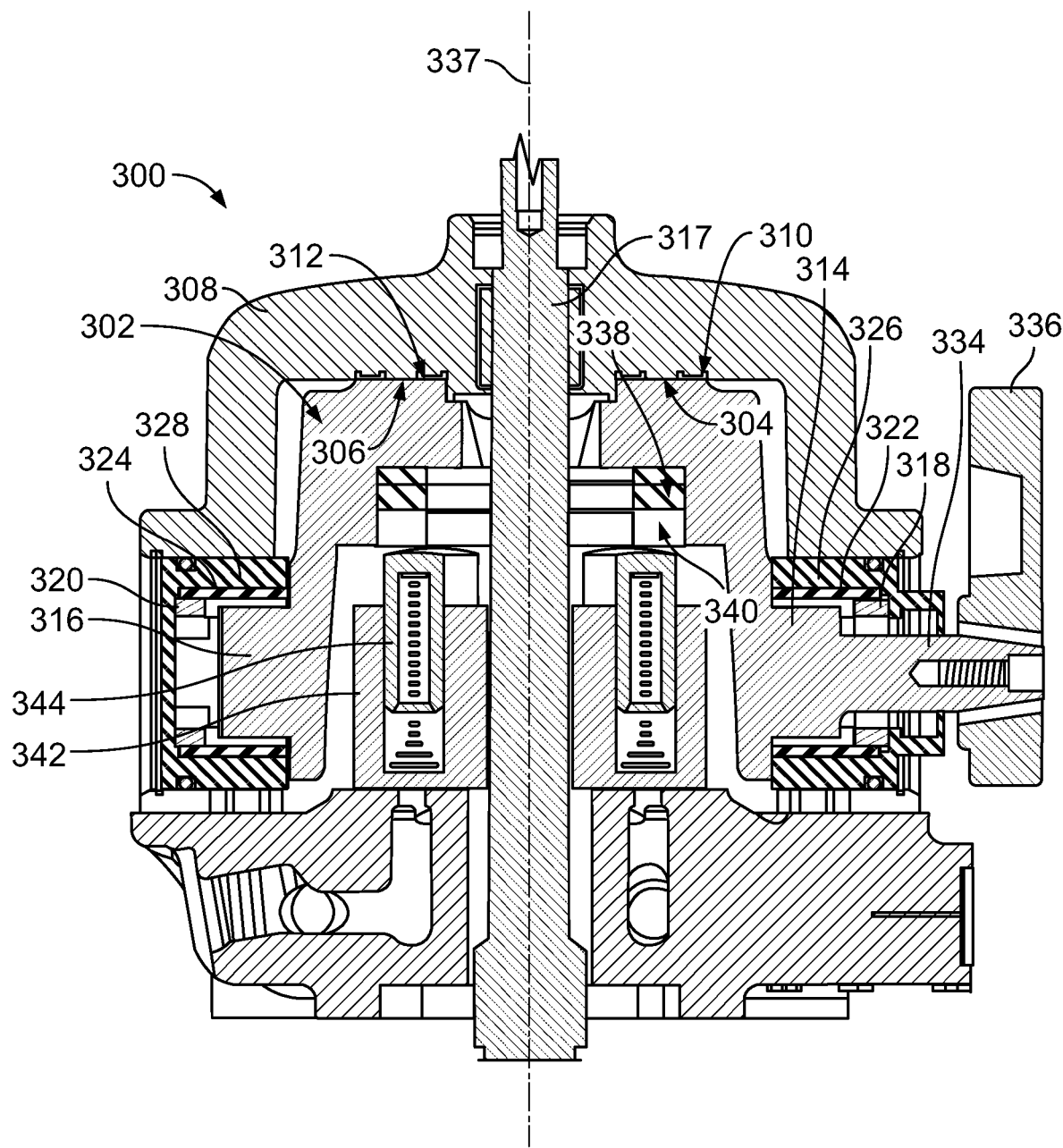
FIG. 3C illustrates a partial cross section of the hydrostatic transmission shown in FIG. 3A, in accordance with an example implementation.

FIG. 3C illustrates a partial cross section of the hydrostatic transmission 300, in accordance with an example implementation. As depicted in FIG. 3C, the cradle-mounted swash block 302 is supported within the housing 308 at both sides. Particularly, the cradle-mounted swash block 302 has, or is mounted to, two cylindrical trunnion arms 314 and 316 extending on both sides therefrom. The trunnion arms 314 and 316 are configured to be perpendicular to an input shaft 317.

The trunnion arms 314 and 316 interface with two locator bushings 318 and 320. In examples, support bushings 322 and 324 may be disposed between the locator bushings 318 and trunnion arm caps 326 and 328. Specifically, an interior peripheral surface of the support bushing 322 may interface with an exterior peripheral surface of the locator bushing 318, while an exterior peripheral surface of the support bushing 322 may interface with an interior peripheral surface of the trunnion arm cap 326. Similarly, an interior peripheral surface of the support bushing 324 may interface with an exterior peripheral surface of the locator bushing 320, while an exterior peripheral surface of the support bushing 324 may interface with an interior peripheral surface of the trunnion arm cap 328.

Referring back to FIG. 3B, the housing 308 includes trunnion bushing bores 330 and 332 configured to receive the trunnion arm caps 326 and 328, respectively, and facilitate mounting the cradle-mounted swash block 302 to the housing 308. With this configuration, the cradle-mounted swash block 302 is supported on both sides thereof.

FIG. 3C also depicts a control arm 334 integrated with the trunnion arm 314 and the cradle-mounted swash block 302 and extending outwardly therefrom. An input lever 336 is coupled to an end of the control arm 334. With this configuration, as the input lever 336 is rotated, the control arm 334, the trunnion arm 314, and the cradle-mounted swash block rotate about an axis perpendicular to a longitudinal axis 337 of the input shaft 317. The cradle-mounted swash block 302 rotates while supported at both sides via both trunnion arms 314 and 316.

As shown in FIG. 3C, the cradle-mounted swash bock 302 is configured to receive a thrust bearing 338 and a swash plate 340 coupled thereto. The hydrostatic transmission 300 also includes a pump barrel 342 configured to house a plurality of piston(s) 344 in a respective plurality of longitudinal bores therein. The piston(s) 344 are configured to engage with and are secured against the swash plate 340. The pump barrel 342 and the piston(s) 344 are configured to rotate with the input shaft 317 about the longitudinal axis 337. At the same time, the piston(s) 344 are configured to reciprocate linearly within the pump barrel 342 along an axis parallel to the longitudinal axis 337 of the input shaft 317. Thus, the pump barrel 342 and the piston(s) 344 are configured similar to the pump barrel 232 and the piston(s) 234.

Figure 3D:
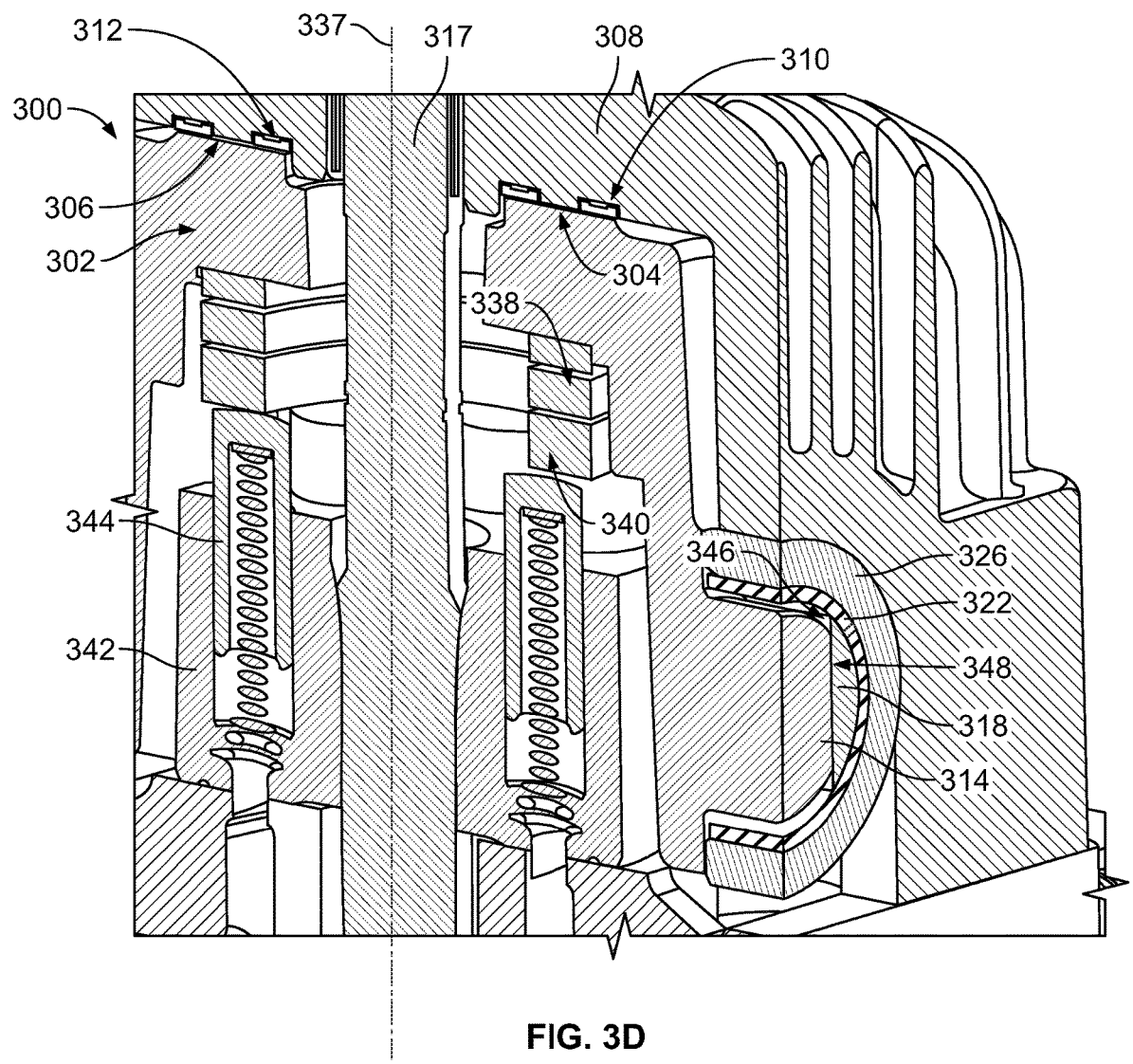
FIG. 3D illustrates a partial perspective view of a cross section of the hydrostatic transmission shown in FIG. 3A, in accordance with an example implementation.
Figure 3E:
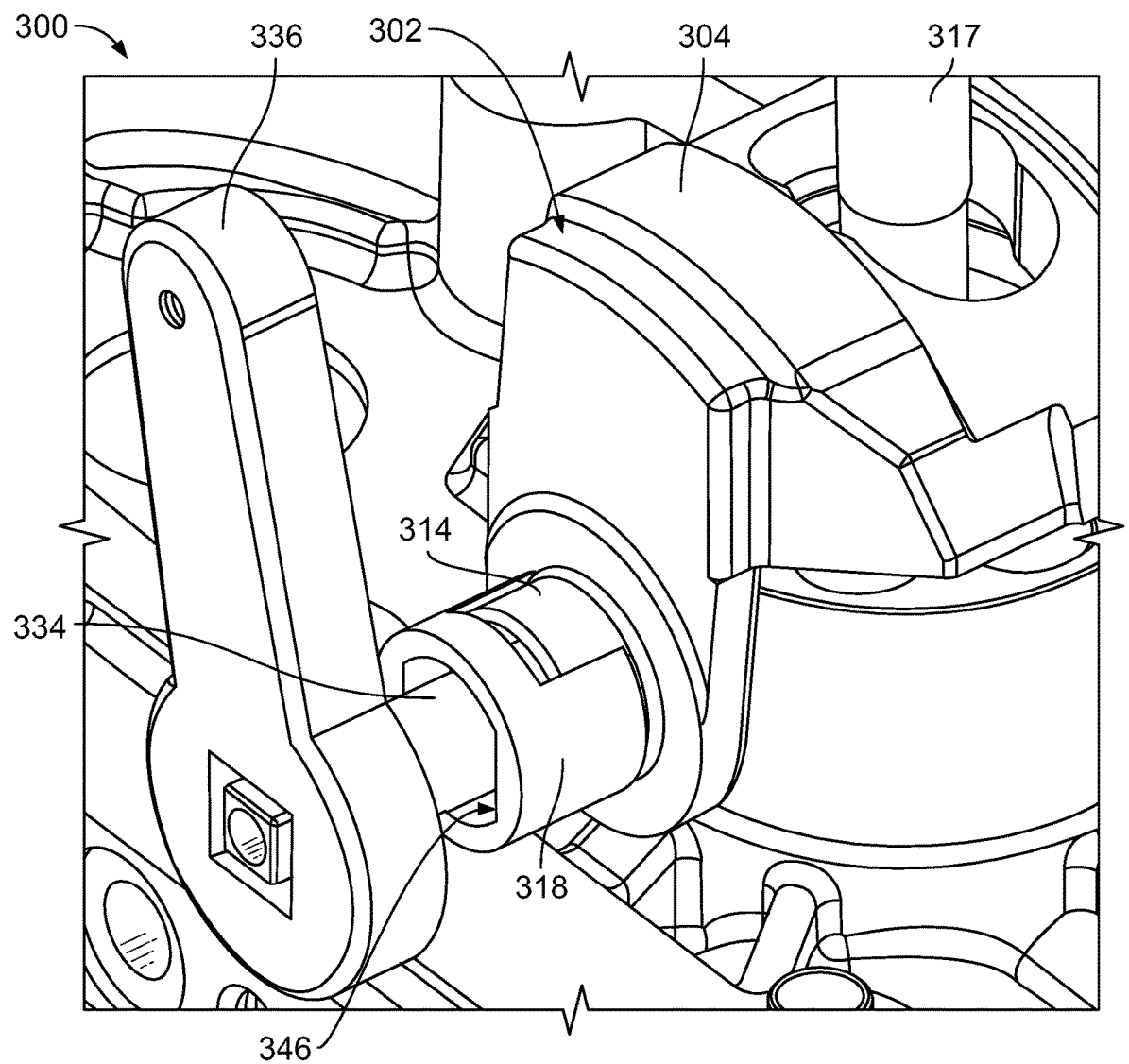
FIG. 3E illustrates another perspective view of the hydrostatic transmission shown in FIG. 3A, in accordance with an example implementation.

To illustrate the configuration of the locator bushings 318 and 320, FIG. 3D illustrates a partial perspective view of a cross section of the hydrostatic transmission 300, and FIG. 3E illustrates another perspective view of the hydrostatic transmission 300, in accordance with an example implementation. FIGS. 3D and 3E are described together.

As illustrated in FIGS. 3D and 3E, in examples, the locator bushing 318 is double half-moon shaped. With this configuration, the locator bushing 318 has a partially-circular or curved exterior surface, and defines a flat interior surface 346. Also, a portion of the trunnion arm 314 is double-D shaped so as to define a flat exterior surface 348 that slidably interfaces with the flat interior surface 346 defined by the locator bushing 318.

With this configuration, the cradle-mounted swash block 302 floats in an internal chamber or internal space of the housing 308 while being supported on both sides at the trunnion arms 314 and 316. When the input lever 336 is rotated to change an angle of the swash plate 340, the cradle-mounted swash block 302 is maintained planar without twisting by virtue of being supported on both sides. Further, the flat interior surface 346 of the locator bushing 318 guides and constrains the cradle-mounted swash block 302 to slide along the flat interior surface 346. Thus, the locator bushing 318 precludes the cradle-mounted swash block 302 from twisting about the longitudinal axis 337 of the input shaft 317 when the input lever 336 is rotated. The locator bushing 320 is configured similar to the locator bushing 318, and thus also constrains motion of the cradle-mounted swash block 302 and precludes twisting.

Therefore, with this configuration, the cradle-mounted swash block 302 achieves the advantages of the trunnion-mounted swash block 202 in that twisting and binding may be prevented. Also, similar to the trunnion-mounted swash block 202, the cradle-mounted swash block 302 has a single-piece configuration, which allows for enhanced control of an angle of the swash plate 340 due to the direct connection between the input lever 336 and the swash plate 340. This configuration creates a zero backlash assembly, which renders a one-to-one relationship between an angle of the input lever 336 and a respective angle of the swash plate 340.

At the same time, the cradle-mounted swash block 302 is similar to the configuration of FIGS. 1A-1E in that rotation of the input lever 336 causes the support surfaces 304 and 306 to slide relative to the bushings 310 and 312 in the housing 308. The cradle-mounted swash block 302, however, floats and is not directly mounted to the housing 308, and thus the housing 308 is isolated from the cradle-mounted swash block 302. Further, a lubricant or a fluid is disposed between the support surfaces 304 and 306 and the bushings 310 and 312. This fluid may absorb and dampen any vibration or noise energy generated as the piston(s) 344 rotate and reciprocate, thus isolating the housing 308 from the vibration and noise. In this manner, the configuration shown in FIGS. 3A-3E achieves advantages of both the configuration of FIGS. 1A-1E and the configuration of FIGS. 2A-2C.

The components and configuration shown in FIGS. 3A-3E could be varied and are not meant to be limiting. For example, the input lever 336 could be mounted directly to the locator bushing 318 instead of being mounted to the control arm 334, which is integrated with the trunnion arm 314. In this example, when the input lever 336 rotates, a torque is applied to the locator bushing 318, which then applies a torque to the trunnion arm 314. This configuration may further isolate the input lever 336 from the cradle-mounted swash block 302.

In another example, the locator bushings 318 and 320 may be enlarged, and the support bushings 322 and 324 could be eliminated. In this example, the locator bushing 318 could be directly interfacing with the trunnion cap 326, and the locator bushing 320 could be directly interfacing with the trunnion cap 328. In this example, the locator bushings 318 and 320 could be made of a standard bushing material such as bronze, plastic, possibly others.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A pump comprising:
   a swash block having (i) a first trunnion arm on a first side of the swash block, (ii) a second trunnion arm on a second side of the swash block, and (iii) a first curved support surface and a second curved support surface disposed on an exterior surface of the swash block;
   a housing comprising (i) a first bore, (ii) a second bore, and (iii) an interior surface bounding a portion of an internal chamber within the housing, wherein the housing further comprises a first recessed area and a second recessed area that are recessed from the interior surface;
   a first curved bushing disposed in the first recessed area of the housing between the first curved support surface of the swash block and the housing, such that the first curved bushing is enclosed within the first recessed area except on a side on which the first curved bushing interfaces with the first curved support surface of the swash block; and
   a second curved bushing disposed in the second recessed area of the housing between the second curved support surface of the swash block and the housing, such that the second curved bushing is enclosed within the second recessed area except on a respective side on which the second curved bushing interfaces with the second curved support surface of the swash block,
   wherein the swash block is supported within the internal chamber of the housing by the first trunnion arm being positioned in the first bore of the housing, the second trunnion arm being positioned in the second bore of the housing, the first curved support surface being positioned against the first curved bushing of the housing, and the second curved support surface being positioned against the second curved bushing of the housing.

2. The pump of claim 1, further comprising:
   a locator bushing disposed between the first trunnion arm and the first bore, wherein the locator bushing has a curved exterior peripheral surface and a flat interior surface, and wherein the flat interior surface of the locator bushing is coupled to a corresponding flat exterior surface of the first trunnion arm.

3. The pump of claim 2, wherein the locator bushing is a first locator bushing, the pump further comprising:
   a second locator bushing disposed between the second trunnion arm and the second bore, wherein the second locator bushing has a respective curved exterior surface and a respective flat interior surface, wherein the respective flat interior surface is coupled to a corresponding flat exterior surface of the second trunnion arm.

4. The pump of claim 2, wherein a portion of the first trunnion arm forms a double-D shaped shaft that defines the corresponding flat exterior surface coupled to the flat interior surface of the locator bushing.

5. The pump of claim 2, wherein the locator bushing is double half-moon shaped that defines the curved exterior peripheral surface and the flat interior surface.

6. The pump of claim 2, further comprising:
   a support bushing that is cylindrical and disposed between the locator bushing and the first bore.

7. The pump of claim 6, further comprising:
   a trunnion arm cap disposed between the support bushing and the first bore, such that (i) an interior peripheral surface of the support bushing interfaces with the curved exterior peripheral surface of the locator bushing, and (ii) an exterior peripheral surface of the support bushing interfaces with an interior peripheral surface of the trunnion arm cap.

8. A pump comprising:
   a swash block having a first curved support surface and a second curved support surface disposed on an exterior surface of the swash block;
   a first trunnion arm mounted to the swash block and extending from a first side of the swash block;

a second trunnion arm mounted to the swash block and extending from a second side of the swash block opposite the first side;

a housing defining: (i) an internal chamber in which the swash block is disposed, wherein the internal chamber includes a first curved bushing and a second curved bushing, (ii) a first bore, wherein the first trunnion arm is rotatably mounted through the first bore, and (iii) a second bore, wherein the second trunnion arm is rotatably mounted through the second bore, such that the swash block is supported at the first bore and the second bore, wherein the first curved bushing interfaces with the first curved support surface and the second curved bushing interfaces with the second curved support surface; and a locator bushing disposed between the first trunnion arm and the first bore, wherein the locator bushing has a curved exterior peripheral surface and a flat interior surface, and wherein the flat interior surface of the locator bushing is coupled to a corresponding flat exterior surface of the first trunnion arm.

9. The pump of claim 8, wherein the locator bushing is a first locator bushing, the pump further comprising:

a second locator bushing disposed between the second trunnion arm and the second bore, wherein the second locator bushing has a respective curved exterior surface and a respective flat interior surface, wherein the respective flat interior surface is coupled to a corresponding flat exterior surface of the second trunnion arm.

10. The pump of claim 8, wherein the locator bushing is double half-moon shaped that defines the curved exterior peripheral surface and the flat interior surface.

11. The pump of claim 8, wherein a portion of the first trunnion arm forms a double-D shaped shaft that defines the corresponding flat exterior surface coupled to the flat interior surface of the locator bushing.

12. The pump of claim 8, further comprising:

a support bushing that is cylindrical and disposed between the locator bushing and the first bore.

13. The pump of claim 12, further comprising:

a trunnion arm cap disposed between the support bushing and the first bore, such that (i) an interior peripheral surface of the support bushing interfaces with the curved exterior peripheral surface of the locator bushing, and (ii) an exterior peripheral surface of the support bushing interfaces with an interior peripheral surface of the trunnion arm cap.

14. A hydrostatic transmission comprising:

a motor section housing a motor rotatable by fluid; and a pump section coupled to the motor section and configured to provide the fluid to the motor, wherein the pump section includes:

a swash block mounted to a first trunnion arm extending from a first side of the swash block and a second trunnion arm extending from a second side of the swash block opposite the first side, wherein the swash block has a first curved support surface and a second curved support surface disposed on an exterior surface of the swash block, a housing comprising (i) a first bore, (ii) a second bore, and (iii) an internal chamber having a first curved bushing and a second curved bushing, wherein the swash block is supported within the internal chamber of the housing by the first trunnion arm being positioned in the first bore of the housing, the second trunnion arm being positioned in the second bore of the housing, the first curved support surface being positioned against the first curved bushing of the housing, and the second curved support surface being positioned against the second curved bushing of the housing, and a locator bushing disposed between the first trunnion arm and the first bore, wherein the locator bushing is double half-moon shaped that defines a curved exterior peripheral surface and a flat interior surface, wherein the flat interior surface is coupled to a corresponding flat exterior surface of the first trunnion arm.

15. The hydrostatic transmission of claim 14, wherein the pump section further comprises:

a swash plate disposed in the swash block;

a pump barrel defining a plurality of longitudinal bores therein;

a plurality of pistons disposed in the plurality of longitudinal bores and configured to engage the swash plate; and an input shaft coupled to the pump barrel, such that rotation of the input shaft causes the pump barrel and the plurality of pistons disposed therein to rotate about a longitudinal axis of the input shaft.

16. The hydrostatic transmission of claim 15, further comprising:

an input lever coupled to the first trunnion arm, wherein rotation of the input lever causes: (i) the first trunnion arm to rotate, and (ii) the first curved support surface to slide relative to the first curved bushing and the second curved support surface to slide relative to the second curved bushing, and (iii) the swash block and the swash plate disposed therein to rotate about an axis perpendicular to the longitudinal axis of the input shaft, thereby changing a stroke of the plurality of pistons as the plurality of pistons rotate about the longitudinal axis of the input shaft.

17. The hydrostatic transmission of claim 16, wherein the input lever is mounted to the locator bushing.

18. The hydrostatic transmission of claim 14, wherein the locator bushing is a first locator bushing, the pump section further comprising:

a second locator bushing disposed between the second trunnion arm and the second bore, wherein the second locator bushing is double half-moon shaped that defines a respective curved exterior peripheral surface and a respective flat interior surface coupled, wherein the respective flat interior surface is coupled to a corresponding flat exterior surface of the second trunnion arm.

19. The hydrostatic transmission of claim 14, wherein a portion of the first trunnion arm forms a double-D shaped that defines the corresponding flat exterior surface of the first trunnion arm.

20. The hydrostatic transmission of claim 14, wherein a lubricant is disposed between the first curved support surface and the first curved bushing to facilitate relative motion therebetween, and the lubricant is disposed between the second curved support surface and the second curved bushing to facilitate relative motion therebetween.

* * * * *